E. V. SANDERS.
PNEUMATIC CUSHIONING DEVICE FOR VEHICLES.
APPLICATION FILED DEC. 22, 1913.
1,140,002.
Patented May 18, 1915.
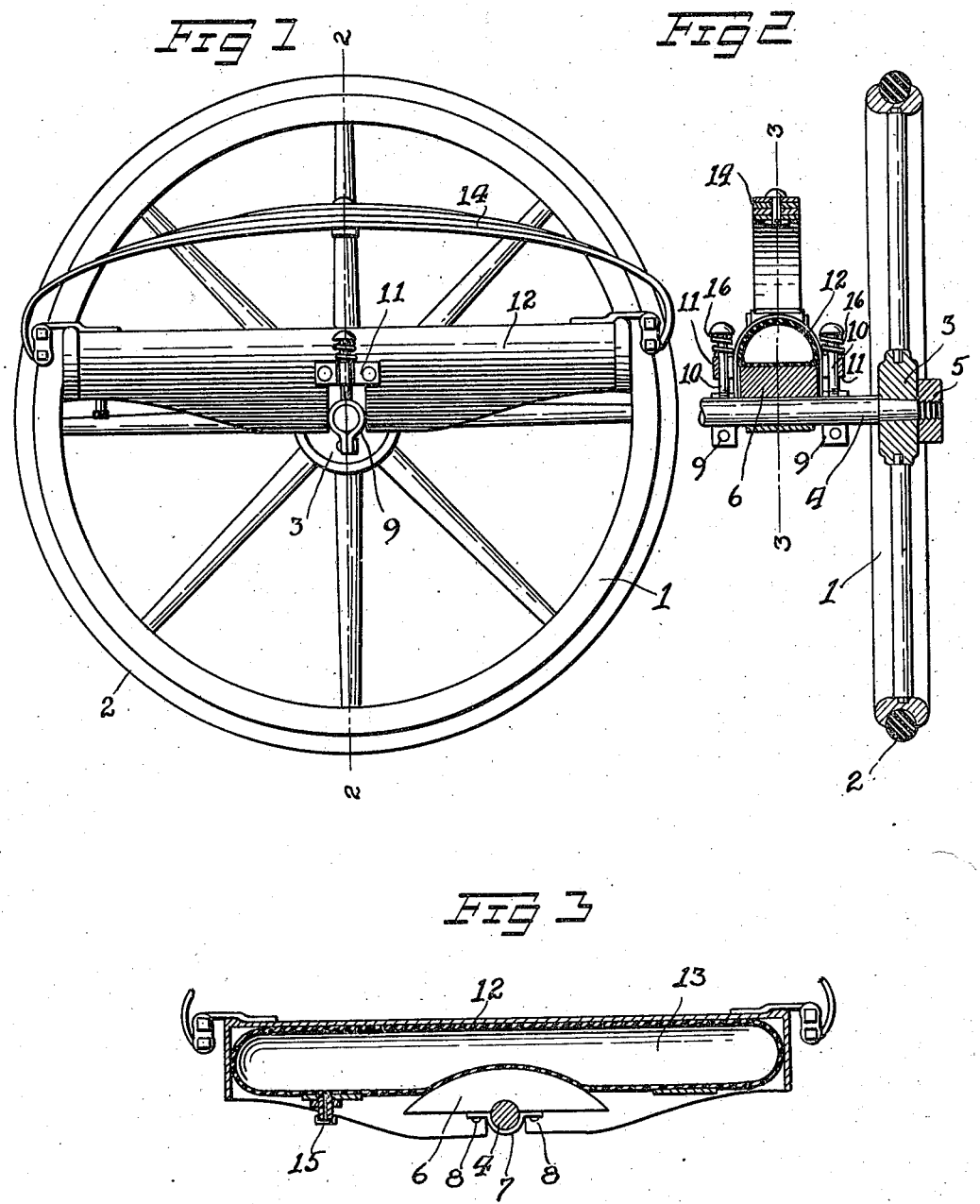
WITNESSES:
Leo Matthews
Sarah Schwartz.
EARL V. SANDERS
INVENTOR.
BY Fred. D. Dilloway
ATTORNEY

UNITED STATES PATENT OFFICE.

EARL V. SANDERS, OF PAWNEE, ILLINOIS.

PNEUMATIC CUSHIONING DEVICE FOR VEHICLES.

1,140,002.      Specification of Letters Patent.     Patented May 18, 1915.

Application filed December 22, 1913. Serial No. 808,293.

*To all whom it may concern:*

Be it known that I, EARL V. SANDERS, a citizen of the United States, residing at Pawnee, in the county of Sangamon and State of Illinois, have invented new and useful Improvements in Pneumatic Cushioning Devices for Vehicles, of which the following is a specification.

My invention relates to pneumatic cushioning devices for vehicles and refers more particularly to that class of devices designed as substitutes for the pneumatic tires now used on automobiles.

The object of my invention is to provide a device in which the cushioning and shock absorbing qualities of the ordinary pneumatic tire may be retained, and the wear on the cushioning means be reduced to a minimum by removing that means from direct contact with the ground.

A further object is to arrange my cushioning means in a position where it will be easily accessible for refilling with air or for repairs, and at the logical position to receive the shock and jar to the best advantage.

With the above and other objects in view, my invention comprises a rearrangement of elements and a novel construction of parts which will be hereinafter fully described, illustrated in the attached drawings, and pointed out specifically in the appended claims.

In the accompanying drawings, the preferred construction and arrangement of the elements of my device is embodied wherein, like reference characters refer to like or corresponding parts throughout the several views.

Figure 1 is a side elevation of my device, looking at a vehicle wheel from the inside. Fig. 2 is a vertical sectional view, taken on line 2—2 of Fig. 1. Fig. 3 is a longitudinal sectional view through the cushioning means and housing therefor, taken on line 3—3 of Fig. 2.

Referring now to the drawings, numeral 1 designates a vehicle wheel about which is attached a tire 2, which tire is preferably of solid rubber, or similar resilient material.

Numeral 3 designates a hub, through which passes a shaft or axle 4, a nut 5 being screwed thereon to hold the wheel from longitudinal movement thereon.

The vehicle body supporting and cushioning device comprises a preferably arcuate block 6, anchored to the axle 4 by any suitable means, as by the cap 7 and bolts 8. On each side of the block 6 are clamps 9, which are drawn tightly together about the axle 4 by bolts, and which are provided with upwardly extending pins 10. Slidably attached to pins 10, by means of bearings 11, a housing member 12 is mounted, which housing extends at right angles to axle 5, the center of the length thereof being on a line with the axle. Housing 12 is preferably formed with the upper side circular in cross section, and with the ends closed, while the under side is open. The cushioning element 13 is positioned within housing 12, the upper portion of the cushion resting against the upper rounded portion of the housing and the lower side thereof supported by the block 6. A leaf spring 14, of the usual type, provides the support for the vehicle body, which body may be attached by any well-known method, and which has not been shown.

It will be seen that as air is forced into cushion 13 through valve 15 that the air in the cushion will cause the cushion to bear against the upper portion and ends of the housing 12, allowing the weight of the vehicle body to be carried by the cushion supported by the block 6 on axle 4.

It is preferable to so arrange the length of pins 10 that the cushion 13, when inflated to its normal working size, will support the vehicle body and housing 12 at such a height that the bearings 11 on each side of the housing will be positioned at about midway of the height of pins 10. Between the upper side of bearings 11 and the buffer head or nut on the upper ends of pins 10, are coil springs 16, which springs are adapted to cushion the upward movement of the housing when a jar is sufficient to cause such an upward movement.

From the foregoing description, it will be readily seen that my invention provides improved means for cushioning the jar in vehicles, and that, by a rearrangement of old elements, I have provided a substitute mechanism for the pneumatic tire as ordinarily employed, which will eliminate the wear on such a cushioning means by the removal of that means from direct contact with the ground.

While I have herein described and illustrated a preferred embodiment of my invention, I do not wish to be restricted thereto, except for such restrictions as the claims may import, as it is obvious that slight changes in the relation and construction may be made without departing from the broad spirit of the invention.

Having thus described my invention, what I claim is:—

1. In a pneumatic cushioning device for vehicles, the combination with a vehicle wheel and axle, of an elongated cylindrical pneumatic cushion supported by and carried across said axle, an elongated semi-cylindrical housing resting on said cushion and positioned to support the main body of a vehicle, vertical guide pins carried by said axle and adapted to receive said housing, buffer head on said guide pins adapted to limit upward and downward movement of the housing, vertically perforated slide means on the housing whereby said housing may move upward and downward on the guide pins carried by said axle, cushioning means positioned between the slide means on the housing and the buffer heads on the guide pins, substantially as described.

2. In a pneumatic cushioning device for vehicles, the combination with a vehicle wheel and axle, of an elongated cylindrical pneumatic cushion supported at right angles to said axle, an arcuate block anchored to said axle and adapted to support a pneumatic cushion, an elongated housing supported at right angles to the axle by said cushion, guide pins anchored to said axle on each side of said housing, slide members on said housing positioned to slide upward and downward on said guide pins, a buffer head on the upper end of each of said guide pins, coil springs about said guide pins between the buffer heads and the slide members on said housing, and a scroll elliptical leaf spring supported at each end by said housing and adapted to support the body of a vehicle thereon, substantially as described.

3. In a pneumatic cushioning device for vehicles, the combination with a vehicle wheel and axle, of an elongated cylindrical pneumatic cushion supported at right angles to said axle, an arcuate block anchored to said axle and adapted to support a pneumatic cushion, an elongated housing supported at right angles to the axle by said cushion, vertical guide pins anchored to said axle on each side of said housing, vertically perforated slide members fixed on each side of said housing and positioned to slide vertically on the guide pins, a buffer head on the upper end of said guide members, coil springs about said guide pins between the buffer heads and slide members on the housing, and a scroll elliptical leaf spring supported on each end by said housing and adapted to support the body of a vehicle thereon, substantially as described.

EARL V. SANDERS.

Witnesses:
Jos. L. Snyder,
H. E. Farnam.

Copies of this patent may be obtained for five cents each, by addressing the "Commissioner of Patents, Washington, D. C."